Figure 1:
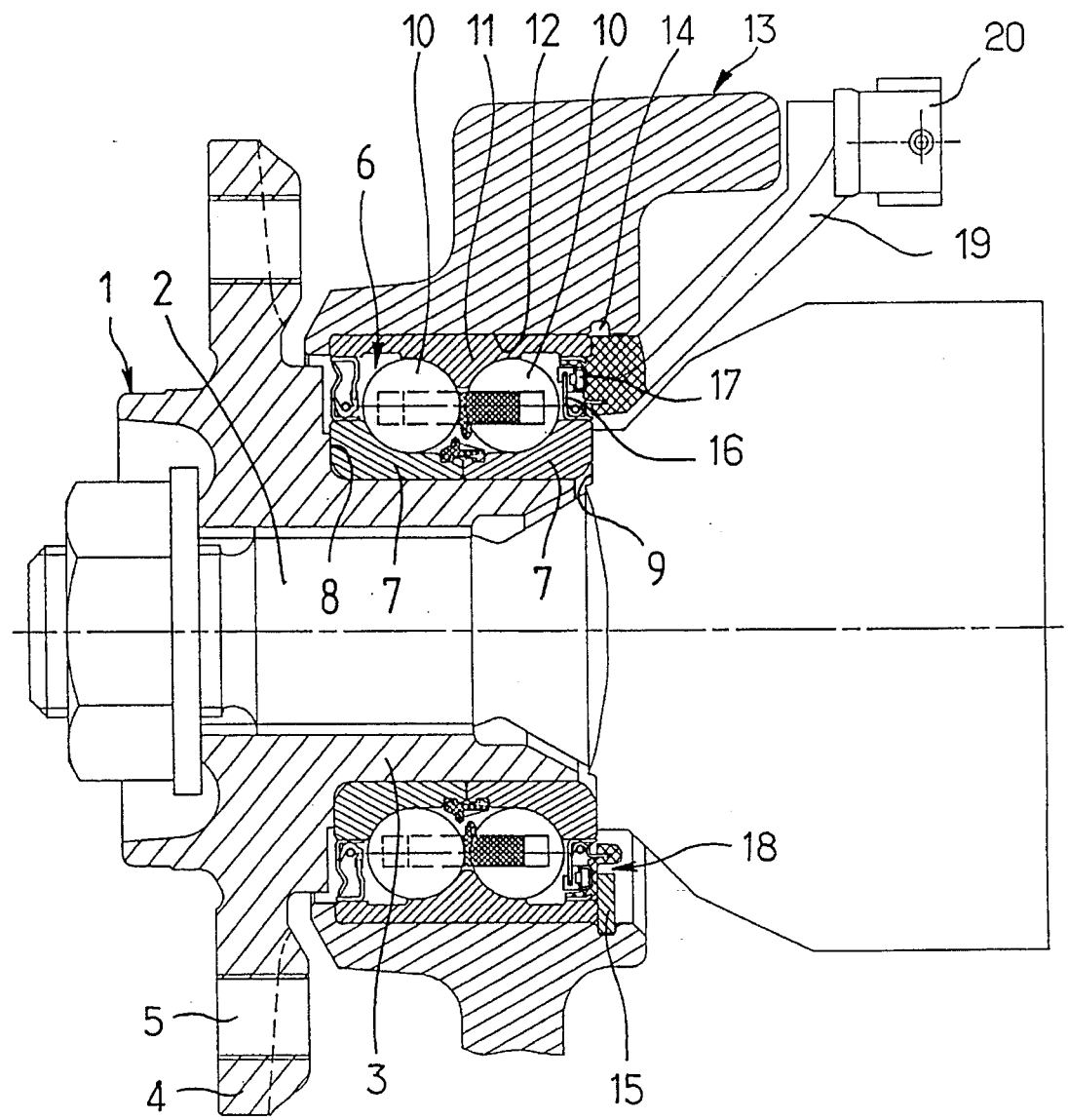

United States Patent [19]

Caillault et al.

[11] Patent Number: 5,564,838
[45] Date of Patent: Oct. 15, 1996

[54] MEMBER FOR AXIAL RETENTION OF A ROLLING-CONTACT BEARING WITH INFORMATION SENSOR AND ROLLING-CONTACT BEARING ASSEMBLY INCLUDING SUCH A MEMBER

[75] Inventors: Claude Caillault, Saint Roch; Christophe Houdayer, Tours; Christian Rigaux, Artannes sur Indre; Pascal Lhote, Saint Cyr sur Loire, all of France

[73] Assignee: SKF France, France

[21] Appl. No.: 416,075

[22] Filed: Apr. 3, 1995

[30] Foreign Application Priority Data

Apr. 15, 1994 [FR] France ................... 94 04514

[51] Int. Cl.⁶ .......................... F16C 32/00; F16C 41/00
[52] U.S. Cl. .................... 384/448; 384/903; 384/585
[58] Field of Search ............................ 384/448, 510, 384/539, 537, 561, 570, 585, 903; 403/261; 411/517, 520–528

[56] References Cited

U.S. PATENT DOCUMENTS

| | | | |
|---|---|---|---|
| 2,792,264 | 5/1957 | House | 384/539 |
| 3,923,408 | 12/1975 | Belsdorf | 384/585 |
| 4,364,615 | 12/1982 | Euler | 384/903 X |
| 4,433,932 | 2/1984 | Brandenstein et al. | 403/261 |
| 4,614,446 | 9/1986 | Dreschmann et al. | 384/903 X |
| 5,010,290 | 4/1991 | Foster | 384/448 X |
| 5,059,844 | 10/1991 | Anstine | 384/903 X |

FOREIGN PATENT DOCUMENTS

| | | |
|---|---|---|
| 0002786 | 7/1979 | European Pat. Off. . |
| 0192339 | 8/1986 | European Pat. Off. . |
| 2227779 | 11/1974 | France . |
| 2349895 | 4/1975 | Germany .................... 384/570 |
| 3809904 | 10/1989 | Germany . |
| 1335799 | 10/1973 | United Kingdom . |

*Primary Examiner*—Thomas R. Hannon
*Attorney, Agent, or Firm*—Beveridge, DeGrandi, Weilacher & Young, L.L.P.

[57] ABSTRACT

A member for axially retaining a rolling-contact bearing (6) relative to a mechanical element (13) radially adjacent to the rolling-contact bearing consists of an open metallic ring (21) which can be elastically deformed radially, produced from a thin sheet of metal, and including a substantially cylindrical part (22), at least one end of which is equipped with a radial rim intended to interact both with a circular groove (14) formed in a housing (12) of the mechanical element adjacent to the rolling-contact bearing and with the non-rotating race (11) of the rolling-contact bearing, so as to form an axial limit stop for the latter.

28 Claims, 12 Drawing Sheets

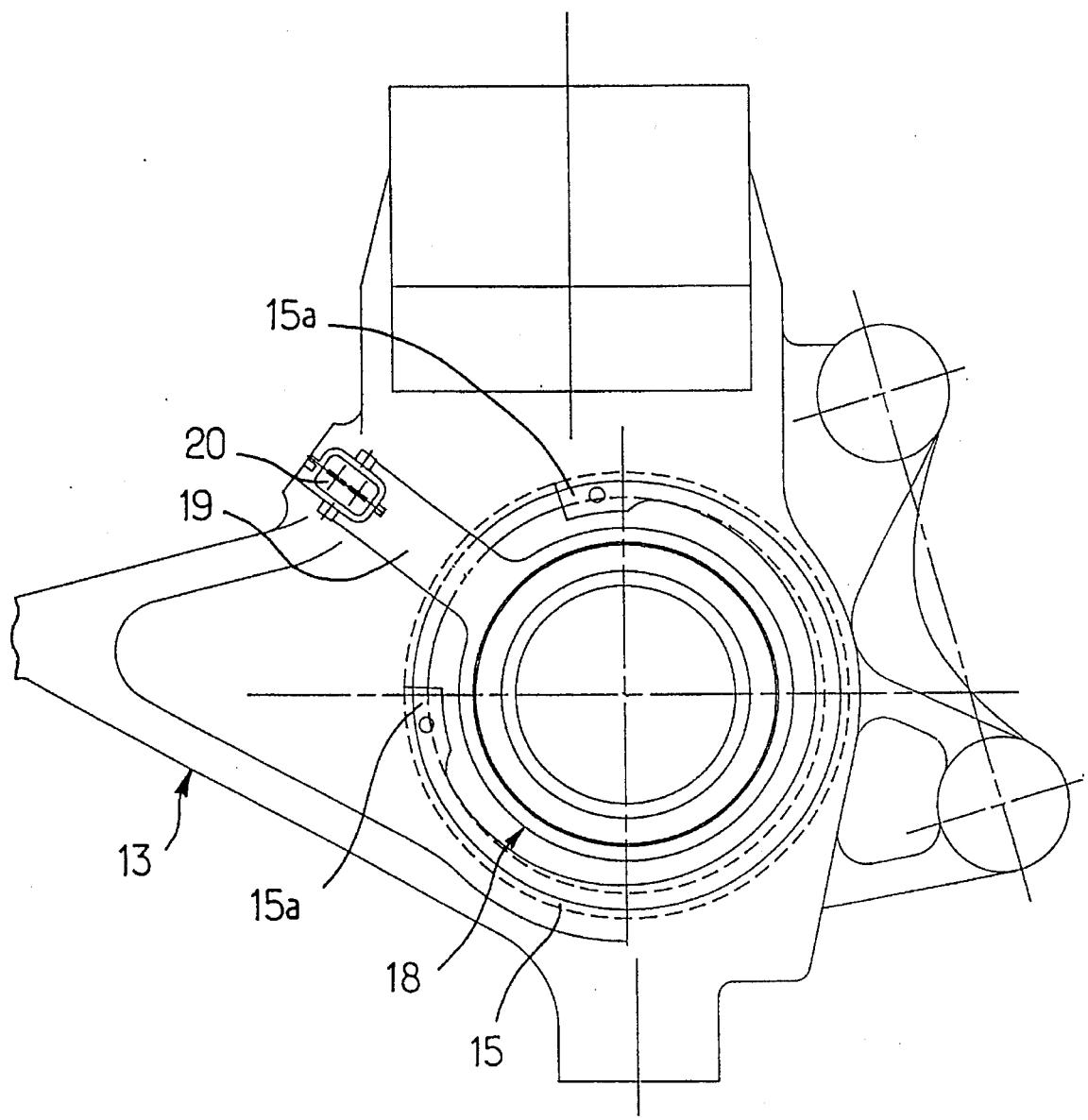
FIG_2
PRIOR ART

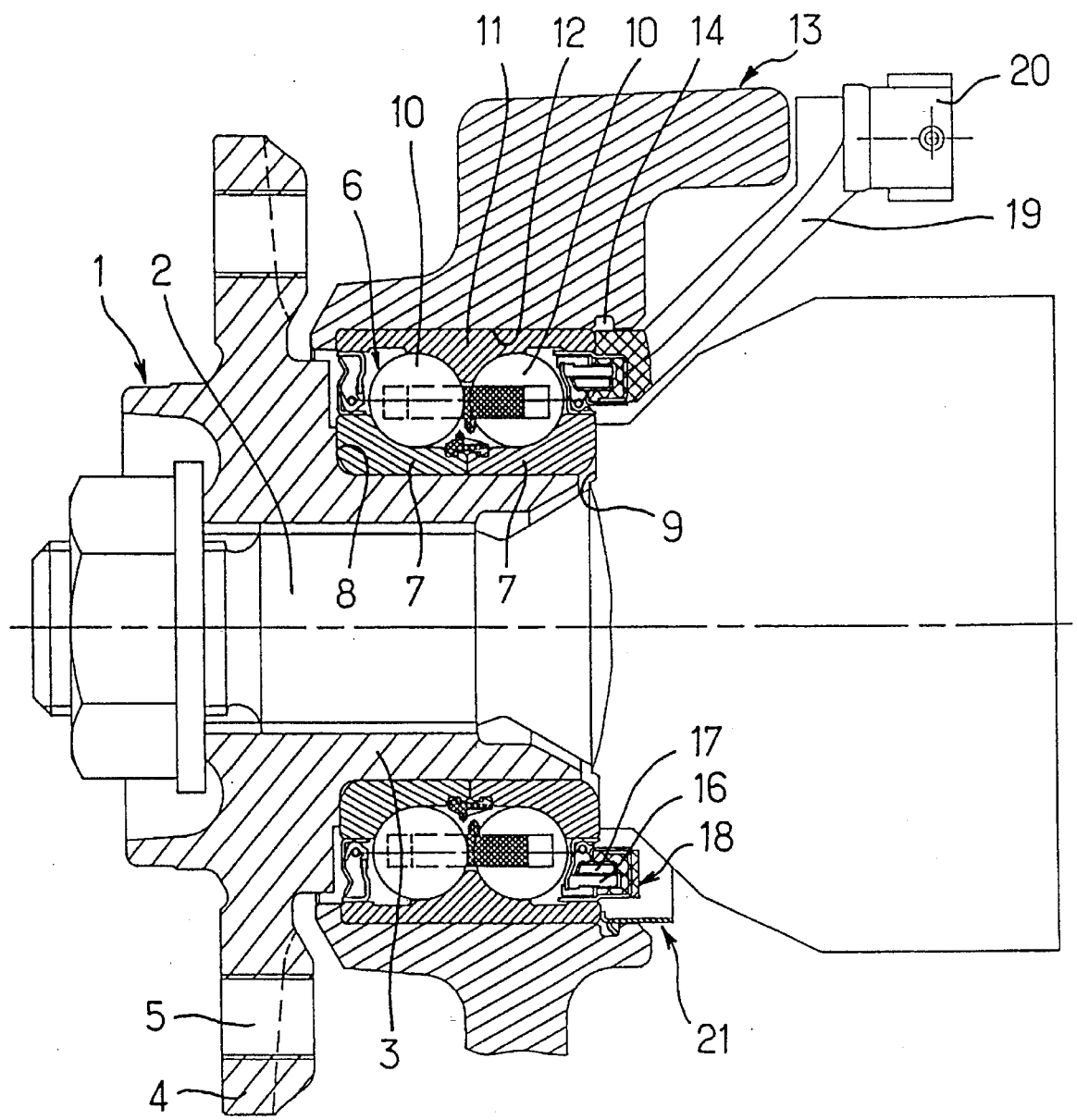

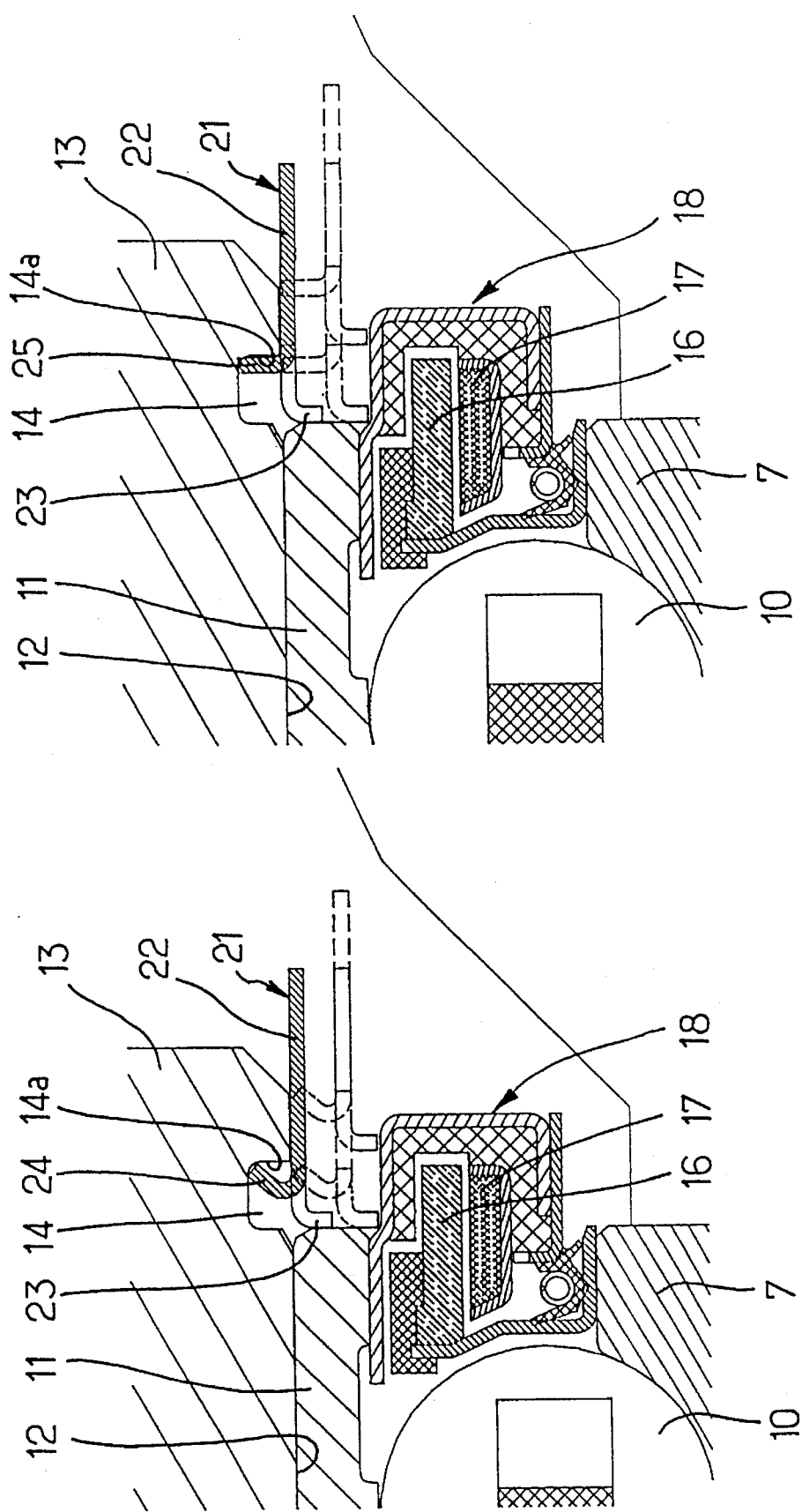

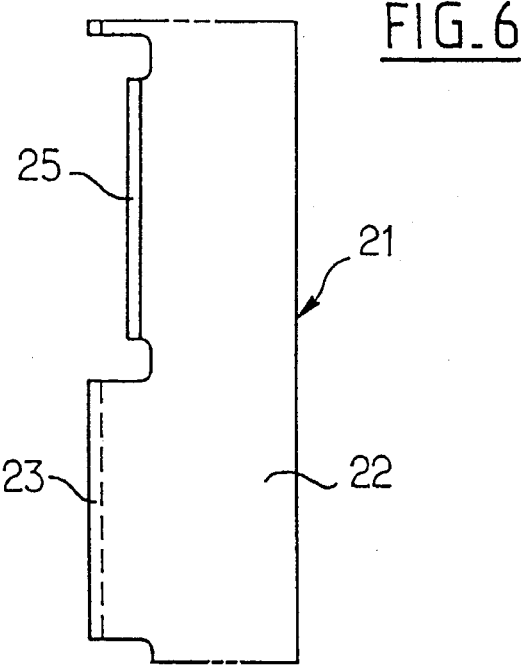
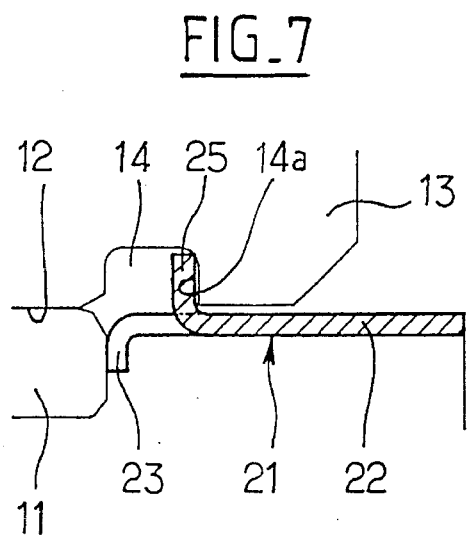
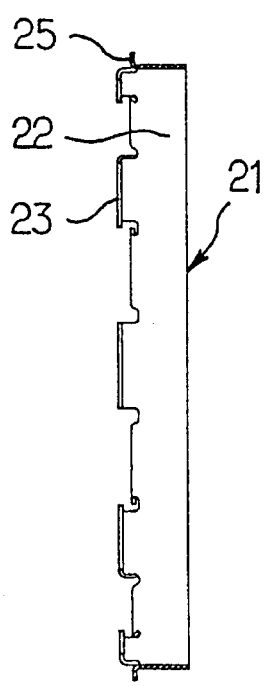
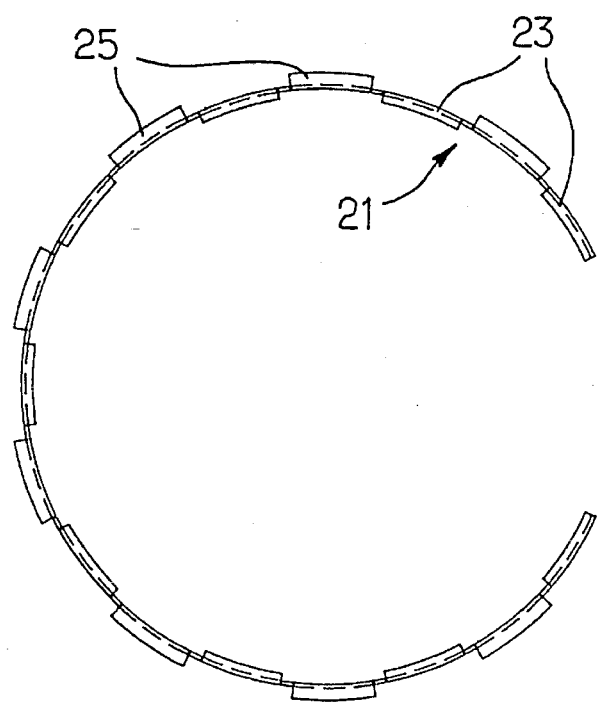

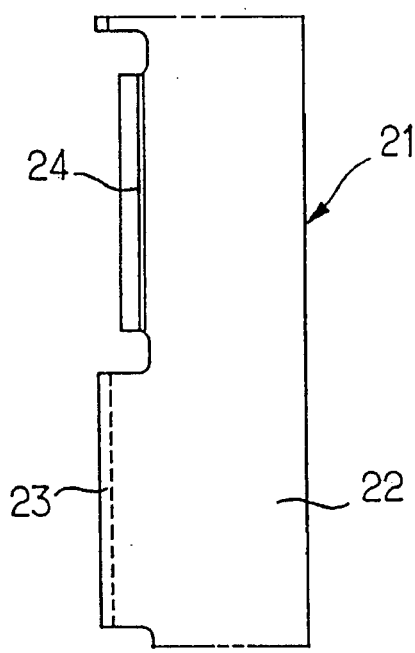
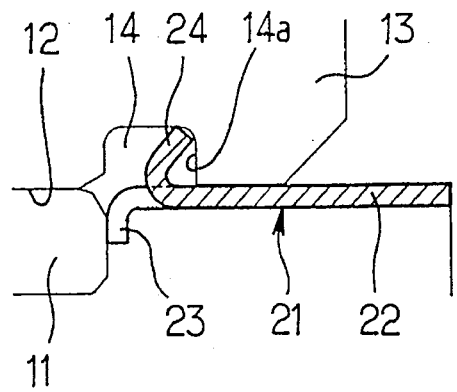
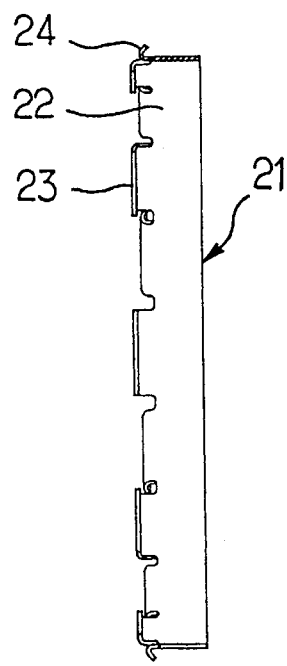
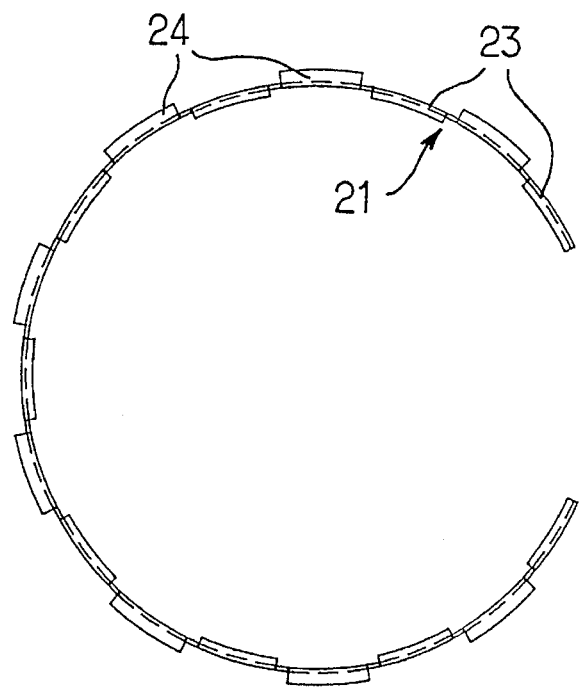

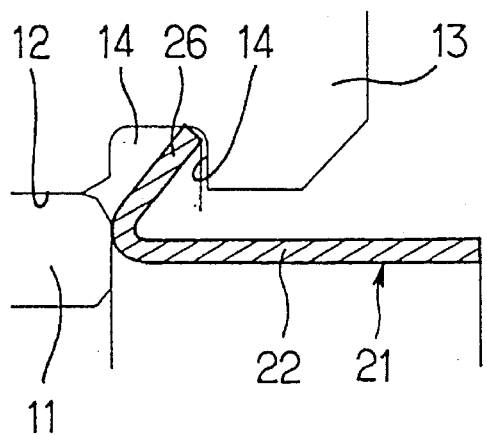
FIG_14
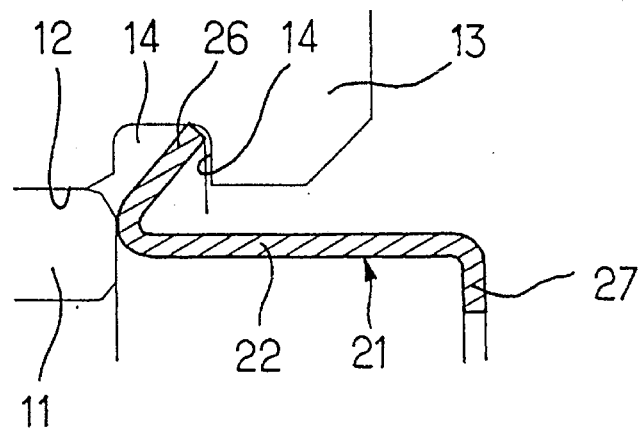
FIG_15
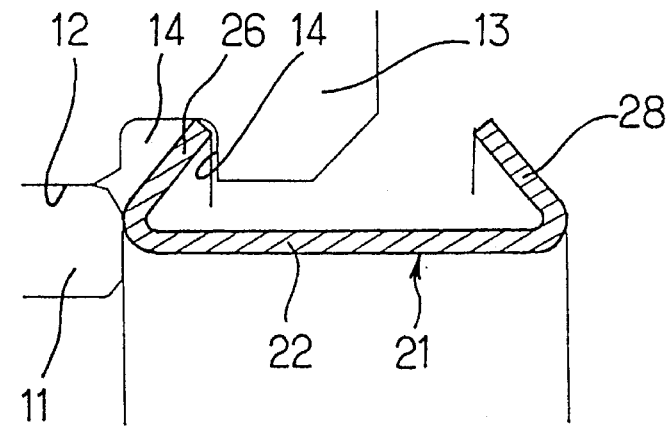
FIG_16

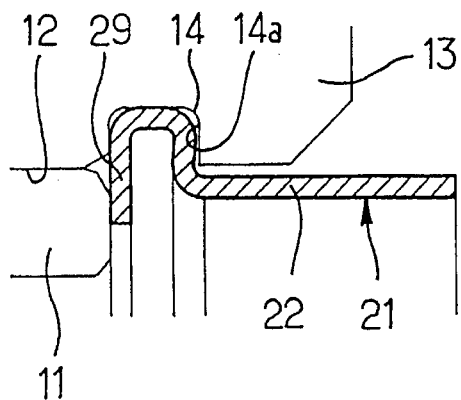
FIG_17
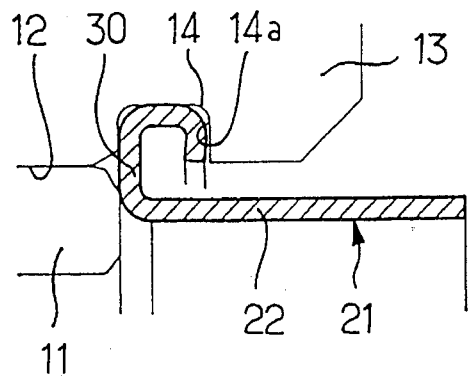
FIG_20
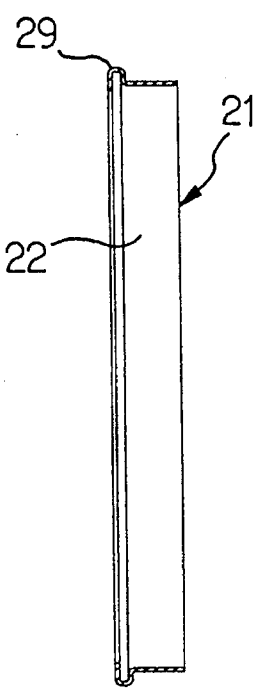
FIG_18
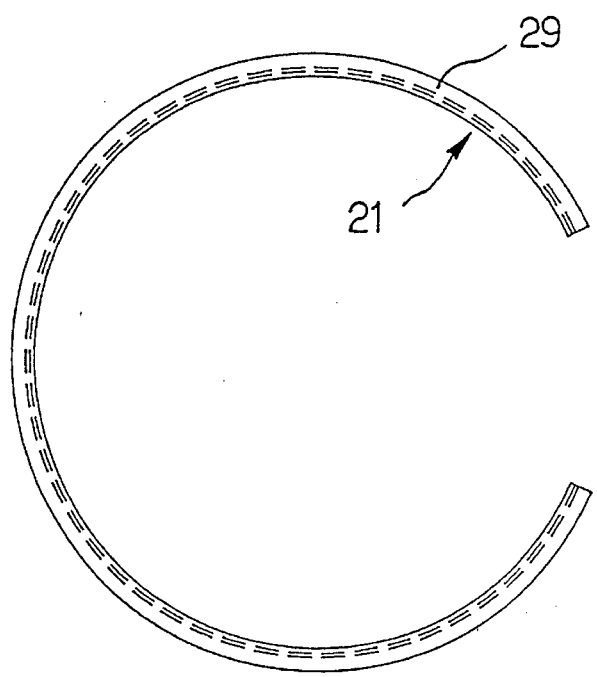
FIG_19

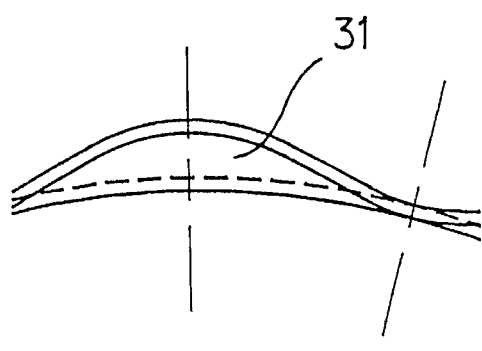
FIG_21
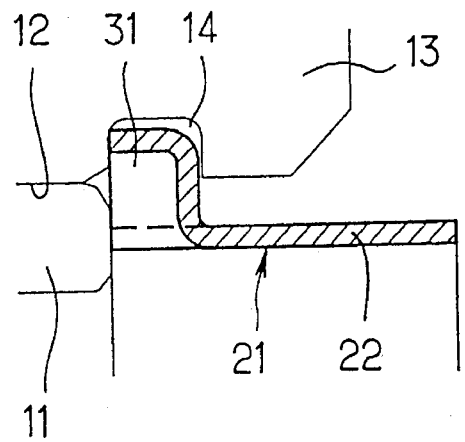
FIG_22
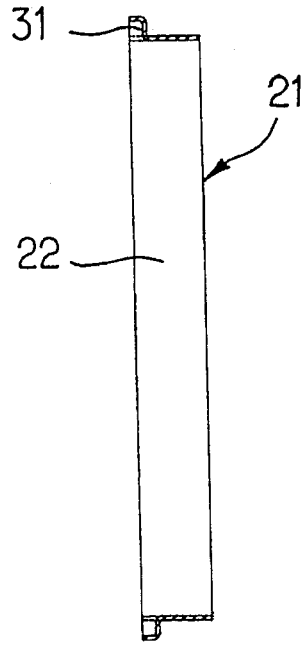
FIG_23
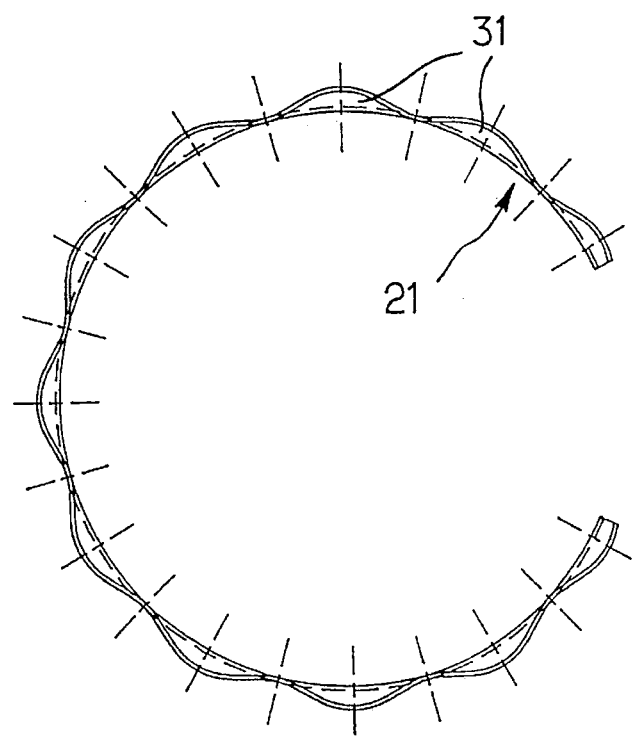
FIG_24

FIG_25
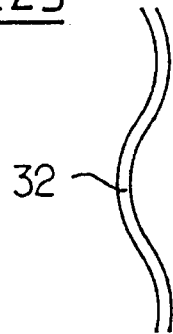
FIG_26
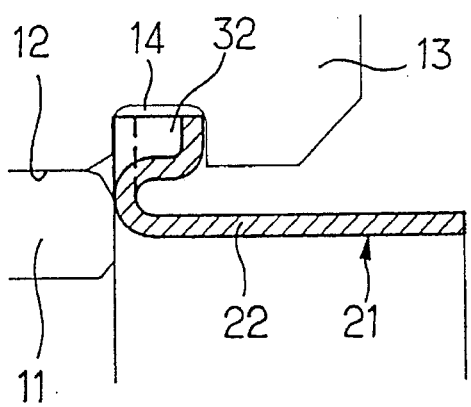
FIG_27
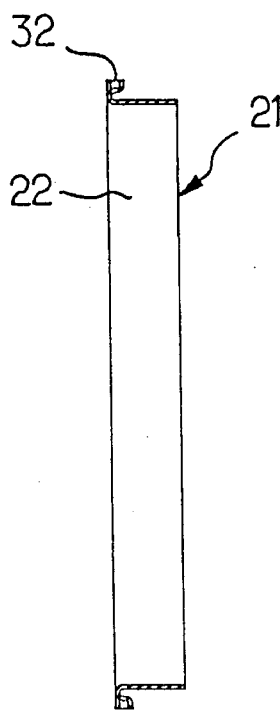
FIG_28
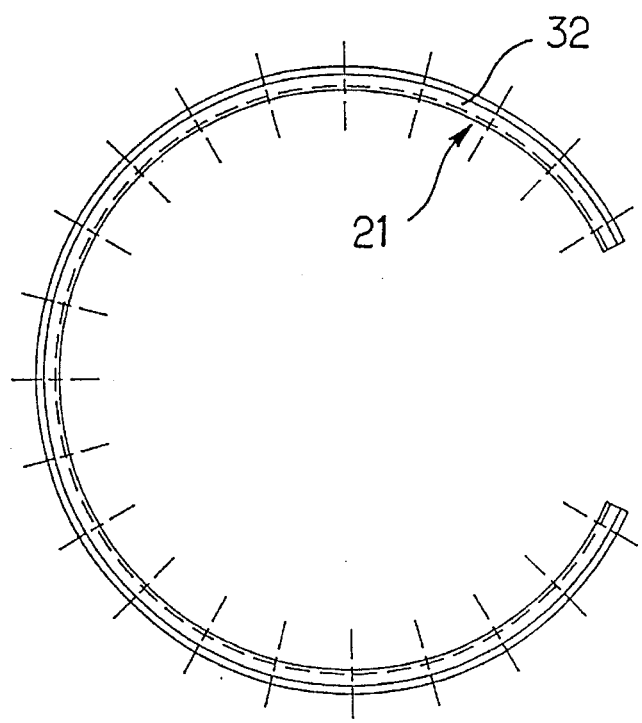

FIG_29
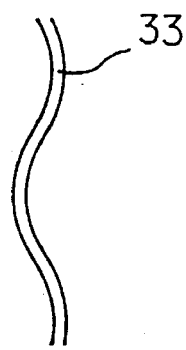
FIG_30
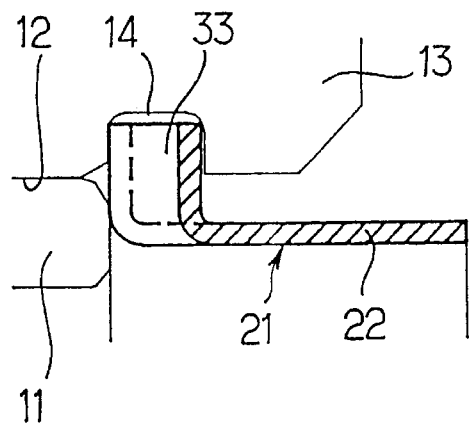
FIG_31
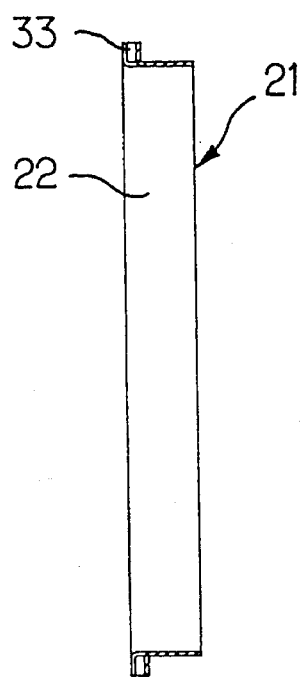
FIG_32
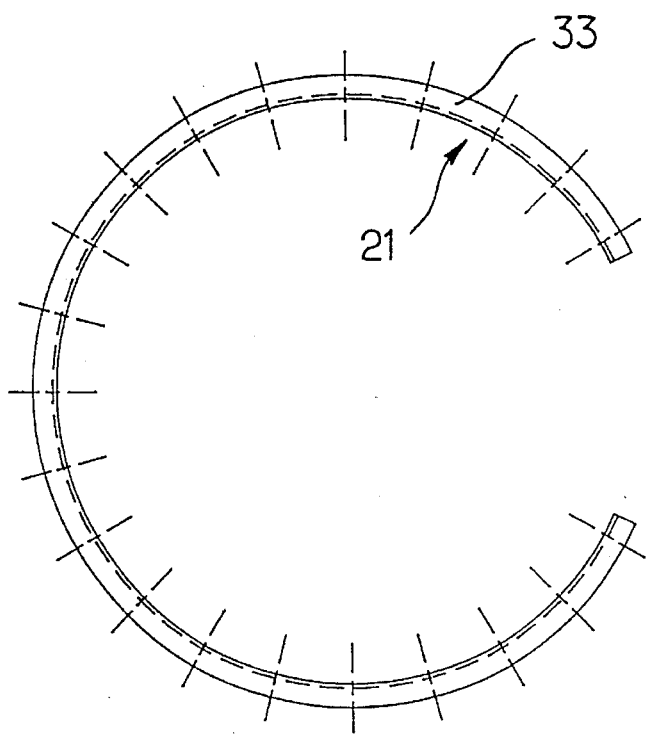

MEMBER FOR AXIAL RETENTION OF A ROLLING-CONTACT BEARING WITH INFORMATION SENSOR AND ROLLING-CONTACT BEARING ASSEMBLY INCLUDING SUCH A MEMBER

The present invention relates to a member for axially retaining a rolling-contact bearing relative to a radially-adjacent mechanical element, for example for the case where the rolling-contact bearing is mounted in a cylindrical housing or around a shaft. A particular application of the invention consists in axially retaining a rolling-contact bearing with an information sensor in a wheel hub assembly for a motor vehicle equipped, for example, with an anti-lock braking system.

Many means exist for axially retaining a rolling-contact bearing relative to a mechanical element radially adjacent to the outer race or to the inner race of the said rolling-contact bearing. A technical means commonly used for its simplicity of implementation consists of a circlip housed through radial elastic deformation in a circular groove of the housing or of the shaft receiving the rolling-contact bearing. The circlip thus forms an effective axial limit stop for the rolling-contact bearing fitted into the housing or onto the shaft.

In the case where the rolling-contact bearing is equipped with an information sensor unit, used, for example, to measure the rotational speed of the rolling-contact bearing, the information sensor unit includes an electrical connector, the head of which is situated at the free end of a shank projecting axially and radially from the rolling-contact bearing. Given that the circlip has a circumferential opening, this opening is used for the shank of the connector of the information sensor unit to pass through.

The use of a circlip as a member for axially retaining the rolling-contacting bearing with information sensor does, however, pose certain technical problems. On the one hand, the radial size of the circlip, some parts of which come opposite the gap between the inner race and outer race of the rolling-contact bearing, forces the assembly formed by the sensor element and the encoder element to be housed inside an annular space axially delimited by the circlip and in particular by the lugs of the circlip. The said lugs project radially on either side of the circumferential opening in the circlip in order to allow a tool to fit and remove the circlip relative to the circular groove of the housing or of the shaft in which the rolling-contact bearing is mounted. The space thus delimited by the circlip may not be sufficient to house the assembly formed by the sensor element and the encoder element, especially when this is a sensor of the passive type including a winding and a magnetic-flux concentrator, both of which are annular and the dimensions of which have to be relatively large in order to provide a good-quality signal. On the other hand, the circumferential opening left by the circlip may not be of sufficiently large size to allow the output shank of the connector to pass through, which would require the use of non-standard circlips with widened circumferential openings.

The object of the present invention is to remedy the aforementioned drawbacks of a conventional circlip by proposing a member for axially retaining the rolling-contact bearing which, whilst retaining its mechanical effectiveness, has a smaller radial size, offers a large circumferential opening, and is easy to fit and remove.

According to the invention, the traditional circlip is replaced with a radially deformable open metallic ring produced from a thin sheet of metal and including a substantially cylindrical part, at least one end of which is equipped with a radical rim intended to interact both with a groove formed in or on the mechanical member radially adjacent to the rolling-contact bearing and with one face of the non-rotating race of the rolling-contact bearing. The mechanical member including the circular groove supports the non-rotating race of the rolling-contact bearing.

Preferably, the substantially cylindrical part projects axially relative to the mechanical member for supporting the rolling-contact bearing in order to allow, on the one hand, a tool to access the axial retention member with a view to fitting it and removing it relative to the circular groove of the mechanical support member and, on the other hand, to act as an annular shield against possible splashes of water, gravel or other external particles thrown up, in order to protect the information sensor unit associated with the rolling-contact bearing.

Figure 33:
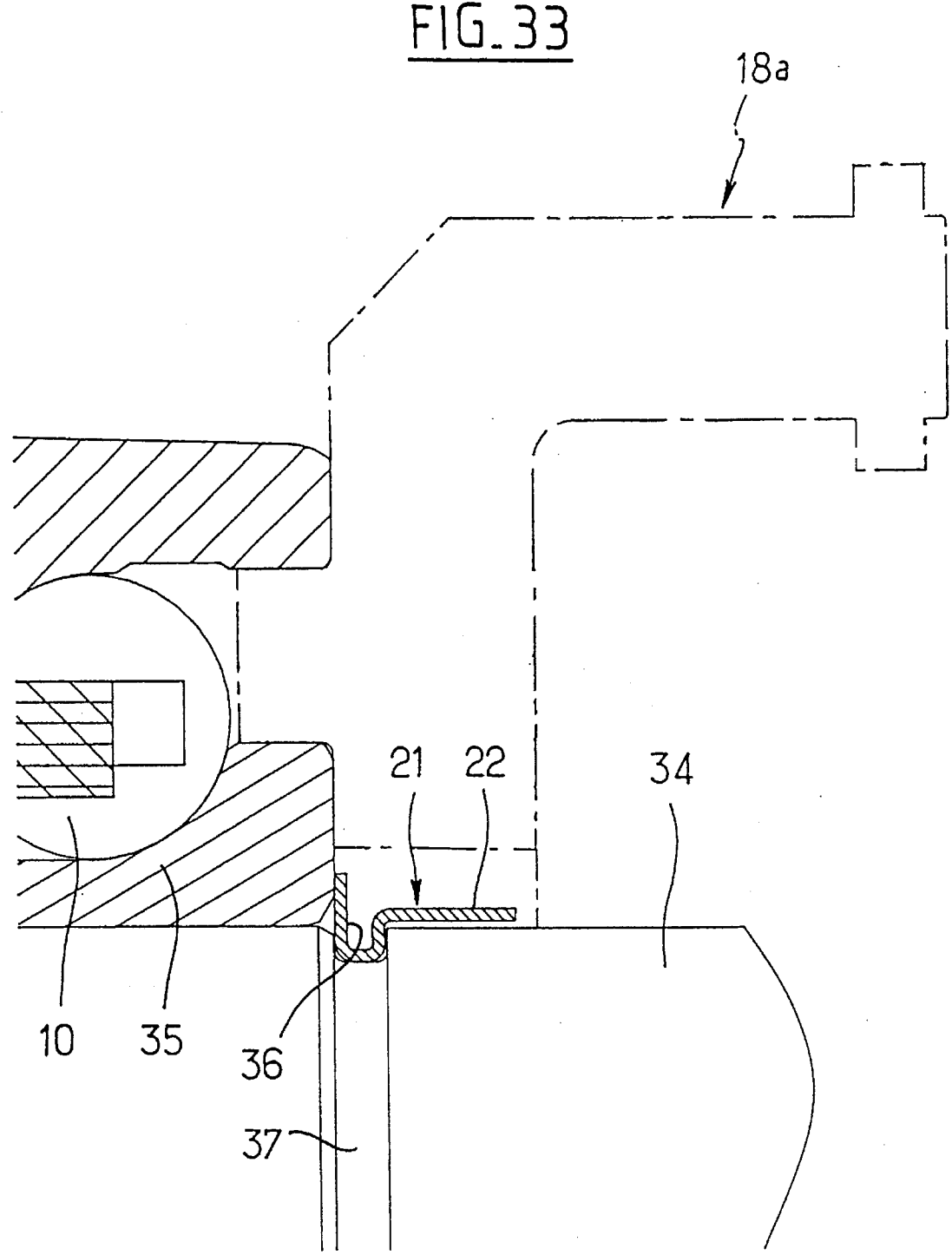

The invention will be better understood from studying the detailed description of a few embodiments taken without any limitation being implied and illustrated by the appended drawings, in which:

FIG. 1 is an axial section of a wheel hub assembly including a conventional circlip for axially retaining the rolling-contact bearing with information sensor, FIG. 2 is an external axial view of the assembly of FIG. 1 showing the shape of the conventional circlip, FIG. 3 is an axial section of a wheel hub assembly equipped with a rolling-contact bearing axial retention member according to the invention, FIG. 4 is a detail of FIG. 3, FIG. 5 is a detail equivalent to FIG. 4, but representing a second embodiment of the axial retention member according to the invention, FIGS. 6 to 9 represent various views of the axial retention member according to FIG. 5, FIGS. 10 to 13 show the various views of the axial retention member according to FIG. 4, FIG. 14 shows an axial retention member according to a third embodiment of the invention, FIG. 15 shows an axial retention member according to a fourth embodiment of the invention, FIG. 16 shows an axial retention member according to a fifth embodiment of the invention, FIGS. 17 to 19 show an axial retention member according to a sixth embodiment of the invention, FIG. 20 shows an axial retention member according to a seventh embodiment of the invention, FIGS. 21 to 24 show an axial retention member according to a eight embodiment of the invention FIGS. 25 to 28 show an axial retention member according to a ninth embodiment of the invention, FIGS. 29 to 32 show an axial retention member according to a tenth embodiment of the invention, and FIG. 33 shows an axial retention member according to an eleventh embodiment of the invention.

To make the invention easier to understand, an application specific to the field of motorcar manufacture has been chosen. FIGS. 1 and 2 illustrate the state of the art considered by the applicant company to be closest to the invention.

A wheel hub i for a driving wheel (not represented) is driven in rotation by an interior shaft 2. The hub 1 includes a cylindrical bearing surface 3 and a radial flange 4 provided with tapped holes 5 arranged circumferentially. The driving wheel (not represented) is mounted on the radial flange 4 with the aid of bolts and nuts which have not been represented, passing through the tapped holes 5. A rolling-contact bearing 6 is tightly fitted axially via its inner race 7 onto the cylindrical bearing surface 3 of the hub 1 and is immobilized axially between a radial shoulder 8 of the cylindrical bearing surface 3 of the hub i and a radial shoulder 9 of the drive shaft 2. Two rows of bearing balls 10 are arranged between the rotating inner race 7 and the non-rotating outer race 11 of the rolling-contact bearing. The outer race 11 is fitted tightly into a cylindrical housing 12 of the stub axle holder 13. The cylindrical housing 12 is provided with a circular groove 14 in which there is mounted a circlip 15 which acts as an axial limit stop for the outer race 11 of the rolling-contact bearing 6. The circlip 15 is in the form of an open annular washer, the ends of which are delimited by lugs 15a (FIG. 2) projecting radially so as to allow access for a tool which has not been represented. The circlip 15 projects radially inwards and delimits an annular space with the outer 11 and inner 7 races of the rolling-contact bearing. An information sensor of which the encoder element 16 is secured to the rotating inner race 7 of the rolling-contact bearing, and the sensor element 17 of which is incorporated into a sensor unit 18 secured to the non-rotating outer race 11 of the rolling-contact bearing is mounted in this space. The sensor unit 18 includes a connector output shank 19 extending radially and axially outwards in order to end in an electrical connector 20. The connector 20 may be connected to a central signal-processing unit which has not been represented, in order to provide it with information relating in particular to the rotational speed of the rotating inner race 7 relative to the non-rotating outer race 11 of the rolling-contact bearing 6, that is to say in order to supply the rotational speed of the corresponding driving wheel.

It can clearly be seen that the radial size of the circlip 15 considerably reduces the space available in the axial direction for accommodating the sensor unit 18, which consequently decreases the potential detection performance of the information sensor.

FIG. 3 illustrates an axial retention member 21 according to the invention which replaces the circlip 15 described previously. The wheel hub assembly in FIG. 3 is comparable to that illustrated in FIG. 1. The essential difference between these two figures lies in the structure of the axial retention member 21 (instead of the circlip 15) and the structure and size of the information sensor. The axial retention member 21 interacts with the circular groove 14 of the housing 12 in the stub axle holder 13 and does not project radially relative to the non-rotating outer race 11 of the rolling-contact bearing. Thus, the gap between the inner 7 and outer 11 races of the rolling-contact bearing 6 is not limited in the axial direction and the sensor unit 18 together with the encoder element 16 can project axially relative to the rolling-contact bearing 6, thus allowing the possibility of using a larger sensor and therefore a sensor which has a higher performance as far as the signal is concerned.

FIGS. 4, and 10 to 13 show a first embodiment of the axial retention member 21 according to the invention. The axial retention member 21 is produced from a thin sheet of metal in the form of an open ring which can be radially deformed. The open ring exhibits a cylindrical part 22 with a radial rim in the form of a double row of tabs 23, 24 which are uniformly distributed around the circumference of the ring and folded alternately in the radial direction towards the inside and towards the outside of the cylindrical part 22. The tabs 24 folded radially outwards are set back axially relative to the tabs 23 folded inwards, form an acute angle relative to the cylindrical part 22, and interact with the bottom of the circular groove 14 of the cylindrical housing 12 in which the outer non-rotating race 11 of the rolling-contact bearing is tightly axially fitted. The internal tabs 23 which project axially relative to the outer tabs 24 are folded in the radial direction in order to constitute an axial limit stop for the outer race 11 of the rolling-contact bearing. The axial span of the internal tabs 23 and external tabs 24 is selected so that they can be immobilized axially between the non-rotating outer race 11 of the rolling-contact bearing on the one hand, and a substantially radial wall 14a opposite of the circular groove 14.

When the axial retention member 21 is fitted, the cylindrical part 22 projects axially relative to the stub axle holder 13 so as to allow, on the one hand, the axial retention member 21 to be manipulated via the cylindrical part 22 in order to create its radial deformation allowing fitting or removal and, on the other hand, in order to allow the axially-projecting cylindrical part 22 to constitute a protective screen for the information sensor 16 and 17 against anything thrown up from outside. The radial elastic deformation of the axial retention member 21 is brought about easily by exerting a force to bring the two circumferential ends of the open ring (FIG. 13) closer together so that the axial retention member 21 can be inserted and removed axially relative to the circular groove 14 (see the part in dotted lines in FIG. 4).

A variant embodiment of the axial retention member 21 relative to what has just been described is represented in FIGS. 5 to 9. In this embodiment, the tabs 25 folded outwards are in the radial direction instead of being inclined like the tabs 24. The radial outer tabs 25 interact with the radial wall 14a of the groove 14 in order to constitute an axial limit stop.

The two embodiments illustrated in FIGS. 3 to 13 rely on tabs 23, 24, 25 knocked back in a staggered configuration so as to form two rows, the faces of which are axially offset, one row of tabs 23 being folded radially inwards and the other row of tabs 24, 25 being folded radially outwards, so that the row folded inwards interacts with the face of the outer race 11 of the rolling-contact bearing, and the row folded outwards interacts with the internal face opposite 14a or an internal ridge of the circular groove 14 formed in the housing 12 set aside for the rolling-contact bearing. The tabs 23, 24 and 25 are obtained by folding material from one end of the cylindrical part 22.

FIG. 14 represents a third embodiment of the axial retention member 21, in which the radial rim consists of a continuous rim 26 folded radially outwards and forming an acute angle relative to the cylindrical part 22. The folded-back rim 26 has, at least at three points on its circumference, an axial spread equal to the predetermined distance between the face of the non-rotating outer race 11 of the rolling-contact bearing and the internal face opposite 14a of the circular groove 14 so as to constitute an axial limit stop for the rolling-contact bearing. This rim 26 may also be discontinuous and consist of a row of tabs which have not been represented. Folding the rim 26 at a slant allows the base of the fold to interact with the radial face of the non-rotating race 11 of the rolling-contact bearing and allows the free end part of the fold to interact with the ridge opposite at the bottom of the circular groove 14.

It is possible to enhance the radial rigidity of the open ring given the small thickness of the sheet metal used. In order to do this, an annular stiffening rib 27, 28 (FIGS. 15 and 16) can be added at the other end of the cylindrical part 22. This annular stiffening rib may have the shape of an internal radial rim 27 (FIG. 15) or an external radial rim 28 (FIG. 16), which may be symmetric relative to the radial limit-stop rim 26 so as to allow the axial retention member 21 to be fitted without orientating it beforehand.

FIGS. 17 to 20 show two other embodiments of the axial retention member 21. The radial limit-stop rim is produced in the form of a U-shaped fold 29, 30, the bottom of which is accommodated elastically in the bottom of the circular groove 14 and the arms of which interact on the one hand with the outer race 11 of the rolling-contact bearing, and on the other hand with the radial wall opposite 14*a* of the circular groove 14.

According to one embodiment illustrated in FIGS. 21 to 24, the radial rim is discontinuous in the circumferential direction with a constant axial spread. The rim consists of undulations 31 with a radial amplitude which defines the radial dimension of the rim as a function of the depth of the circular groove 14. The axial spread of the radial rim with undulations 31 corresponds substantially to the width of the groove 14 so that the axial end of the rim constitutes an axial limit stop for the outer race 11 of the rolling-contact bearing.

FIGS. 25 to 28, on the one hand, and FIGS. 29 to 32, on the other hand, illustrate two more embodiments of the axial retention member 21 for which the radial rim is continuous in the circumferential direction and includes undulations 32 and 33 with an axial amplitude defining the axial extent of the radial rim. The axial extent of the undulations 32 and 33 should correspond to the width of the circular groove 14.

In the case where the inner race of the rolling-contact bearing is non-rotating, the axial retention member 21 may be designed to be fastened in a circular groove made around the non-rotating shaft on which the rolling-contact bearing is fitted. In the example illustrated in FIG. 33, the rolling-contact bearing is fitted around the stub axle 34 via its non-rotating inner race 35. The information sensor indicated in chain line 18*a* is fitted at one end of the rolling-contact bearing. The axial retention member 21 has its radial rim 36 folded radially inwards in order to interact with a groove 37 made around the stub axle 34. One arm 36 extends radially outwards in order to constitute an axial limit stop for the non-rotating inner race 35 of the rolling-contact bearing.

In general, the embodiments of the axial retention member 21 which have been illustrated in FIGS. 3 to 32 may be adapted for the case of FIG. 33 where the inner race is non-rotating. In this case it would suffice to reverse the radial rim radially, that is to say instead of projecting radially outwards, the rim projects radially inwards relative to the cylindrical part 22 and vice versa. By virtue of the invention, it is possible to benefit from much more space in the axial direction between the inner and outer races of the rolling-contact bearing 6 for fitting the assembly formed by the sensor element 17 and encoder element 16 of the information sensor. In contrast to a conventional circlip, the open ring 21 constituting the axial retention member in fact does not protrude radially towards the inside of the face of the outer race (or towards the outside of the face of the inner race) of the bearing, and consequently leaves the space situated in the axial extension of the gap between the inner and outer races of the rolling-contact bearing free. It is therefore possible to put this space to good use for fitting larger sensors which are therefore capable of providing a more powerful signal. Likewise, the width of the opening of the elastic ring 21 allows the shank 19 of the connector of the sensor unit 18 to pass through easily, by comparison with a conventional circlip.

We claim:

1. Member for axially retaining a rolling-contact bearing relative to a mechanical element radially adjacent to the rolling-contact bearing and having a circular groove formed thereon or therein, comprising:

an open metallic ring which can be elastically deformed radially and which is formed from a thin sheet of metal, the metallic ring including a substantially cylindrical part having first and second ends, and a radial rim provided on at least the first end, the radial rim being arranged to interact both with the circular groove formed on or in the mechanical element radially and with the non-rotating race of the rolling-contact bearing, so as to form an axial limit stop for the non-rotating race of the rolling-contact bearing.

2. Axial retention member according to claim 1, wherein the radial rim includes two sets of alternating tabs, the first set being folded towards an inside of the cylindrical part and the second set being folded towards an outside of the cylindrical part, such that the first set of tabs is arranged to interact with the non-rotating race of the rolling-contact bearing, and the second set of tabs is arranged to interact with a radial wall of the circular groove formed on or in the mechanical element.

3. Axial retention member according to claim 2, wherein the cylindrical part projects axially relative to the adjacent mechanical element.

4. Axial retention member according to claim 2, wherein both the first and second ends of the cylindrical part are provided with radial rims which symmetric relative to a radial plane.

5. Axial retention member according to claim 1, wherein the radial rim includes a folded-back rim forming an acute angle with the cylindrical part, such that a base of the fold is arranged to interact with the non-rotating race of the rolling-contact bearing, and an end of the fold is arranged to interact with the bottom of the circular groove formed on or in the mechanical element.

6. Axial retention member according to claim 5, wherein the cylindrical part projects axially relative to the adjacent mechanical element.

7. Axial retention member according to claim 5, wherein both the first and second ends of the cylindrical part are provided with radial rims which are symmetric relative to a radial plane.

8. Axial retention member according to claim 1, wherein the radial rim has a folded U-shape such that a bottom of the folded U-shape is arranged interacts with the circular groove.

9. Axial retention member according to claim 8, wherein the cylindrical part projects axially relative to the adjacent mechanical element.

10. Axial retention member according to claim 8, wherein both the first and second ends of the cylindrical part are provided with radial rims which are symmetric relative to a radial plane.

11. Axial retention member according to claim 1, wherein the radial rim includes a rim which is continuous in the circumferential direction and which has undulations of axial amplitude.

12. Axial retention member according to claim 11, wherein the cylindrical part projects axially relative to the adjacent mechanical element.

13. Axial retention member according to claim 11, wherein both the first and second ends of the cylindrical part are provided with radial rims which are symmetric relative to a radial plane.

14. Axial retention member according to claim 1, wherein the radial rim is discontinuous in the circumferential direction, and has undulations having radial amplitude.

15. Axial retention member according to claim 14, wherein the cylindrical part projects axially relative to the adjacent mechanical element.

16. Axial retention member according to claim 14, wherein both the first and second ends of the cylindrical part are provided with radial rims which are symmetric relative to a radial plane.

17. Axial retention member according to claim 1, wherein the cylindrical part projects axially relative to the adjacent mechanical element.

18. Axial retention member according to claim 17, characterized in that the second end of the cylindrical part includes a circular stiffening rib.

19. Axial retention member according to claim 1, wherein both the first and second ends of the cylindrical part are provided with radial rims which are symmetric relative to a radial plane.

20. A wheel hub assembly, comprising:

a rolling-contact bearing having a non-rotating race;

a mechanical element radially adjacent to the rolling-contact bearing, the mechanical element having a circular groove formed thereon or therein; and a retaining member for axially retaining the rolling-contact bearing, the retaining member including an open metallic ring which can be elastically deformed radially and which is formed from a thin sheet of metal, the metallic ring having a substantially cylindrical part having first and second ends, and a radial rim provided on at least the first end, the radial rim interacting both with the circular groove formed on or in the mechanical element radially and with the non-rotating race of the rolling-contact bearing, so as to form an axial limit stop for the non-rotating race of the rolling-contact bearing.

21. A wheel hub assembly according to claim 20, wherein the radial rim includes two sets of alternating tabs, the first set being folded towards an inside of the cylindrical part and the second set being folded towards an outside of the cylindrical part, such that the first set of tabs interacts with the non-rotating race of the rolling-contact bearing, and the second set of tabs interacts with a radial wall of the circular groove formed on or in the mechanical element.

22. A wheel hub assembly according to claim 20, wherein the radial rim includes a folded-back rim forming an acute angle with the cylindrical part, such that a base of the fold interacts with the non-rotating race of the rolling-contact bearing, and an end of the fold interacts with the bottom of the circular groove formed on or in the mechanical element.

23. A wheel hub assembly according to claim 20, wherein the radial rim has a folded U-shape such that a bottom of the folded U-shape interacts with the circular groove.

24. A wheel hub assembly according to claim 20, wherein the radial rim includes a rim which is continuous in the circumferential direction and which has undulations of axial amplitude.

25. A wheel hub assembly according to claim 20, wherein the radial rim is discontinuous in the circumferential direction, and has undulations having radial amplitude.

26. A wheel hub assembly according to claim 20, wherein the cylindrical part projects axially relative to the adjacent mechanical element.

27. A wheel hub assembly according to claim 26, characterized in that the second end of the cylindrical part includes a circular stiffening rib.

28. A wheel hub assembly according to claim 20, wherein both the first and second ends of the cylindrical part are provided with radial rims which are symmetric relative to a radial plane.

* * * * *